United States Patent [19] [11] Patent Number: 4,874,527
Gill [45] Date of Patent: Oct. 17, 1989

[54] METHOD FOR CONTROLLING SILICA/SILICATE DEPOSITION IN AQUEOUS SYSTEMS USING IMINES

[75] Inventor: Jasbir S. Gill, Coraopolis, Pa.

[73] Assignee: Calgon Corporation, Pittsburgh, Pa.

[21] Appl. No.: 187,172

[22] Filed: Apr. 28, 1988

[51] Int. Cl.$^4$ .............................................. C02F 5/14
[52] U.S. Cl. .................................. 210/700; 210/699; 252/181
[58] Field of Search ............................... 210/696–701; 252/180, 181

[56] References Cited

U.S. PATENT DOCUMENTS

| | | | |
|---|---|---|---|
| 4,176,059 | 11/1979 | Suzuki | 210/697 |
| 4,209,398 | 6/1980 | Ii et al. | 252/180 |
| 4,217,216 | 8/1980 | Lipinski | 210/700 |
| 4,328,106 | 5/1982 | Harrar et al. | 210/700 |
| 4,510,059 | 4/1985 | Amjad et al. | 210/701 |
| 4,532,047 | 7/1985 | Dubin | 210/698 |
| 4,584,104 | 4/1986 | Dubin | 210/696 |
| 4,659,482 | 4/1987 | Chen | 210/701 |

Primary Examiner—Peter Hruskoci
Attorney, Agent, or Firm—W. C. Mitchell; M. C. Sudol

[57] ABSTRACT

This invention is directed to a method for controlling the formation of silica/silicate deposits in aqueous systems by adding an effective amount, preferably at least 0.1 ppm, of an imine polymer, a phosphonate and, optionally, a source of molybdate or borate ions to the aqueous system being treated.

2 Claims, No Drawings

METHOD FOR CONTROLLING SILICA/SILICATE DEPOSITION IN AQUEOUS SYSTEMS USING IMINES

BACKGROUND OF THE INVENTION

U.S. Pat. No. 3,928,196 discloses the use of copolymers of 2-acrylamido-2-methylpropylsulfonic acid and acrylic acid as scale inhibitors.

U.S. Pat. No. 4,640,793 discloses the use of admixtures containing carboxylic acid/sulfonic acid polymers and phosphonates as scale and corrosion inhibitors.

U.S. Pat. No. 4,618,448 discloses the use of polymers comprising an unsaturated carboxylic acid, an unsaturated sulfonic acid and an unsaturated polyalkylene oxide as scale inhibitors.

Japanese No. 57-084794 discloses the use of copolymers of acrylic acid and allyl polyethylene glycol as scale inhibitors.

European patent application 84301450.7 discloses carboxylic acid/sulfonic acid copolymers in combination with organic phosphonates as scale inhibitors.

U.S. Pat. No. 4,510,059 discloses the use of carboxylic functional polyampholytes to reduce silica deposits in aqueous systems.

U.S. Pat. No. 4,532,047 discloses a method of inhibiting amorphous silica scale formation using polypolar organic compounds and borate ion sources. The references cited therein are also pertinent to silica/silicate deposition control.

U.S. Pat. No. 4,584,104 discloses a method of inhibiting amorphous silica scale formation using a source of orthoborate ions.

U.S. Pat. Nos. 4,176,059; 4,217,216; and 4,246,030 disclose the use of molybdate compositions for corrosion inhibition.

Silica/silicate deposition in aqueous systems, for example boilers, cooling towers and systems containing hypersaline geothermal brines, is a continuing problem. Traditionally, deposition has been controlled by softening the makeup water to the system being treated, by blowdown, or by both. If deposition occurs, mechanical removal or washing with ammonium fluoride or hydrofluoric acid is generally the method of control. Obviously, mechanical or chemical cleaning causes down time and increased energy and labor costs.

pH affects the ionization of silanol groups and, therefore, affects the polymerization rate. Silica first forms, then three dimensional networks form. Eventually, colloidal particles grow through condensation. At pH 7, nuclei formation and particle growth is very rapid. The pH of cooling water is generally 6.0 to 8.5 and the water temperature is generally about 30° to 70° C. The pH of geothermal brines is generally 4.0 to 6.0 and the brine temperature is generally about 100° to 210° C.

While it is known to use cationic polymers or cationic surfactants as silica scale inhibitors in hypersaline geothermal brines (Harrar. J. E. et al, "Final Report on Tests of Proprietary Chemical Additives as Anti-scalants for Hypersaline Geothermal Brine", January 1980, Lawrence Livermore Laboratory, Harrar, J. E. et al, "On-Line Tests of Organic Additives for the Inhibition of the Precipitation of Silica from Hypersaline Geothermal Brine IV, Final tests of Candidate Additives", February 1980. Lawrence Livermore Laboratories; and Harrar, J. E. et al, "Studies of Scale Formation and Scale Inhibitors at the Salton Sea Geothermal Field", Corrosion/80. Paper No. 225, International Corrosion Forum, devoted exclusively to the Protection and Performance of Materials, Mar. 3–7, 1980. Chicago, IL) the inventors have discovered a method for controlling the deposition of silica and silicates in aqueous systems using polyethylene imines. While such polymers alone are effective inhibitors, phosphonates and molybdates or borates enhance performance under certain conditions. Admixtures comprising a polyethylene imine, a phosphonate and a molybdate, for example, have been shown to prevent the deposition of alkaline earth metal silicates when added to waters containing silica and hardness. Addition of approximately 10 mg/L of each component to makeup allowed a system containing 150 mg/L $SiO_2$ and 200 ppm total hardness (as $Ca^{++}$ and $Mg^{++}$) to be cycled-up 1.6 to 1.8 times without substantial loss of dissolved constituents or deposit formation.

DETAILED DESCRIPTION OF THE INVENTION

The instant invention is directed to a method for controlling silica/silicate deposition in an aqueous system comprising adding an effective amount of a composition comprising:
 (a) a water soluble polyethylene imine having a molecular weight of less than about 50,000, preferably less than about 20,000;
 (b) a phosphonate; and, optionally,
 (c) a molybdate ion or a borate ion source;
to the system being treated.

Molybdate ions are preferred, as molybdate-containing compositions unexpectedly enhance the performance of polyethylene imines under certain conditions.

Any water soluble phosphonate can be used as component (b). Examples include 2-phosphono-1,2,4-tricarboxybutane, amino tri(methylene phosphonic acid), hexamethylene diaminetetra (methylene phosphonic acid), diethylene triamine penta(methylene phosphonic acid), hydroxyethylidene diphosphonic acid, phosphonosuccinic acid, benzene phosphonic acid, 2-aminoethyl phosphonic acid, polyamino phosphonates and the like. Additional phosphonates are identified in U.S. Pat. No. 3,837,803, which is hereby incorporated by reference. The preferred phosphonates are 2-phosphono-1,2,4-tricarboxybutane, hexamethylene diaminetetra (methylene phosphonic acid), and diethylene triamine penta (methylene phosphonic acid.

Any source of molybdate or borate ions can be used as component (c). The preferred molybdate sources are ammonium molybdate and the alkali and alkaline earth metal molybdates, and the preferred borate sources are described in U.S. Pat. Nos. 4,504,104 and 4,532,047, which are hereby incorporated into this specification by reference.

The preferred compositions contain polymer: phosphonate (i.e., component (a):component (b)) weight ratios of about 1:10 to about 10:1, on an active basis. More preferably, these ratios should range from about 4:1 to about 1:4, on an active basis. The most preferred ratios are from about 2:1 to 1:2.

If a molybdate or borate ion source is used, the weight ratio of component (a):component (c) should range from about 1:10 to about 10:1, on an active basis. The preferred compositions contain polymer:ion source weight ratios of about 1:4 to about 4:1, on an active basis.

An effective amount of a polyethylene imine should be added to the aqueous system being treated. As used herein, the term "effective amount" is that amount necessary to control silica/silicate deposition in the system being treated. Generally, the effective amount will range from about 0.1 to about 200 ppm, on an active basis, based on the total weight of the aqueous system being treated, preferably from about 1 to about 200 ppm.

As used herein, the term "controlling silica/silicate deposition" is meant to include inhibition of silica polymerization, threshold precipitation inhibition, stabilization, dispersion, solubilization, and/or particle size reduction of silica, silicates, especially calcium and magnesium silicates, and silicon ions. Clearly, the instant additives are threshold silicate precipitation inhibitors, but they also stabilize, disperse and solubilize silica and silicates and generally reduce the particle size of any precipitated material. Thus, the inventors have discovered that polyethylene imines, alone and in combination a phosphonate and/or a molybdate or borate ion source, inhibit, minimize or prevent silica deposition under severe operating conditions, and intend that the instant specification describe this discovery, without attempting to describe the specific mechanism by which silica/silicate deposition is prevented or inhibited.

The term "aqueous system", as used herein, is meant to include any type of system containing water, including, but not limited to, cooling water systems, boiler water systems, desalinations systems, gas scrubber water systems, blast furnace water systems, reverse osmosis systems, evaporator systems, paper manufacturing systems, mining systems and the like.

The use of a polyethylene imine is critical to the instant method in that these polymers, alone, minimize, inhibit and/or prevent silica/silicate deposition under severe saturation and/or temperature conditions. These polymers are efficient up to a pH of approximately 9.0.

The polymers of the instant invention are well known to those skilled in the water treatment art and are commonly available. Phosphonates and molybdate and borate ion sources are also commonly available.

The compositions disclosed herein effectively control silica/silicate deposition in aqueous systems which have high alkalinity, high calcite saturation and/or high pH values. Such conditions are often times encountered as cycles of concentration increase. Thus, the instant polymer compositions provide silica/silicate protection under severe conditions where conventional silica control agents may be ineffective.

The instant compositions may be added to the system being treated by any convenient means, and the components may be added separately or in combination. A preferred method of addition is via makeup water streams.

Additionally, other conventional water treatment agents, including corrosion inhibitors such as tolyltriazole, can be used with the instant polymers.

EXAMPLES

The following examples demonstrate the use of the instant compositions to inhibit silica/silicate deposition. These examples are not intended to limit the scope of the instant invention in any way.

In these these examples, the following compounds were tested:

CORCAT P-18, which is polyethylene imine having a molecular weight of approximately 1800, commercially available from Cordova Chemical Company.

Ammonium molybdate, which is a source of $MoO_4^{2-}$ ions.

Dequest 2000, which is aminotris(methylene phosphonic acid), commercially available from Monsanto.

Dequest 2010, which is 1 hydroxy ethylidene-1,-1 diphosphonic acid, commercially available from Monsanto.

Dequest 2051, which is hexamethylene diaminetetra (methylene phosphonic acid), commercially available from Monsanto.

Dequest 2060, which is diethylene triamine penta(-methylene phosphonic acid), commercially available from Monsanto.

Bayhibit AM, which is 2-phosphonobutane tricarboxylic acid-1,2,4, commercially available from Mobay.

TEST METHOD

The following procedure was used to evaluate the ability of the instant polymers to prevent the formation and deposition of calcium and magnesium silicates.

A two-liter polypropylene flask having a side arm was filled to the 1500 ml level with makeup water as described in Table I. The temperature of the makeup water was controlled and maintained by immersing an electrically heated 304 stainless steel heat-exchanger into the polypropylene flask. A refractive index liquid level sensor was placed in the side arm to maintain a constant volume in the flask by controlling a solenoid valve on inlet line from the makeup water reservoir.

Evaporation was achieved by passing filtered dry air or nitrogen at a regulated and measured rate through a teflon tube placed at the bottom of the flask. The makeup water was concentrated to various levels (i.e., cycled-up) by controlling the rate of aeration. The pH of the system was controlled by feeding acid or alkali as required by the set point pH on a pH-stat device.

After reaching the targeted cycles of concentration, the cycles were maintained constant for several days. This simulated the operating procedure commonly used in industrial cooling towers. In this case the makeup water in the reservoir was replaced by distilled water to stop further concentration. The makeup water described in Table I was selected because it is stable at room temperature and it gives a sufficient induction time to establish the concentration process before any mineral precipitation occurs. The pH of the makeup water was adjusted to 8-9 and was maintained at the selected pH in the flask during the entire cycling up process. The makeup water contained 10 mg/L of the designated inhibitor. Aliquots were withdrawn at various time intervals, filtered, and analyzed for chloride, calcium, magnesium and silica. The cycles of concentration were determined based on the chloride concentration in the cycled up water. The expected concentration of the other species in solution was then calculated based on the cycles of concentration. The amount of deposit on the heat exchanger was determined by weighing the heat exchanger at the beginning and at the end of each run.

The results are shown in Tables II, III and IV.

TABLE I

CHEMICAL COMPOSITION OF THE MAKEUP WATER

| Ion | Total Concentration (mg/L) |
|---|---|
| Calcium | 100 |
| Magnesium | 7.5 |
| Sodium | 153 |
| Chloride | 199 |
| Sulfate | 219 |
| Silica | 150 |

TABLE II

INHIBITION OF SILICA/SILICATES AT pH 9 ± 0.2 USING AIR OR NITROGEN FOR CYCLING-UP AND HOLDING CONSTANT CYCLES (1.8–2.0) FOR 2–3 DAYS

| Additive | Inhibitor Dosage (mg/L) | Cycling-up Medium | % Inhibition Deposit | % Retention in Solution (mg/L) | | |
|---|---|---|---|---|---|---|
| | | | | $SiO_2$ | Ca | Mg |
| $MoO_4^{-2}$ | 20 | $N_2$ | 59 | 58 | 10 | 7 |
| Dequest 2051 | 10 | Air | 82 | 82 | 40 | 33 |
| | 20 | Air | 85 | 88 | 21 | 0 |
| | 10 | $N_2$ | 89 | 72 | 84 | 31 |
| Dequest 2060 | 10 | Air | 95 | 82 | 83 | 72 |
| | 10 | $N_2$ | 98 | 89 | 93 | 79 |
| Bayhibit AM | 10 | $N_2$ | 97 | 72 | 87 | 84 |
| | 10 | Air | 5 | 74 | 31 | 0 |
| | 20 | Air | 15 | 79 | 69 | 11 |

TABLE III

INHIBITION OF SILICA/SILICATES AT pH 8.8 ± 0.2 USING AIR FOR CYCLING-UP AND HOLDING CONSTANT CYCLES (1.8–2.0) FOR 7–8 DAYS

| Additive | Dosage (mg/L) | % Inhibition Deposit | % Retention in Solution (mg/L) | | |
|---|---|---|---|---|---|
| | | | $SiO_2$ | Ca | Mg |
| Dequest 2051 | 10 | 87 | 59 | 95 | 4 |
| Bayhibit AM | 10 | 85 | 59 | 8 | 0 |

TABLE IV

INHIBITION OF SILICA/SILICATES AT pH 8.8 ± 0.2 USING AIR FOR CYCLING-UP THE MAKE-UP WATER* AND HOLDING CONSTANT CYCLES (1.8–2.0) FOR 3 DAYS

| Additive | Dosage (mg/L) | % Inhibition Deposit | % Retention in Solution (mg/L) | | |
|---|---|---|---|---|---|
| | | | $SiO_2$ | Ca | Mg |
| Dequest 2060 | 10 | 98 | 67 | 62 | 52 |
| $MoO_4^{2-}$ | 20 | 16 | 58 | 3 | 0 |
| Bayhibit AM | 10 | — | 45 | 11 | 0 |
| Corcat P-18 | 10 | + | 40 | 0 | 11 |
| | 20 | 66 | 42 | 14 | 53 |
| Corcat P-18 + Bayhibit AM | 10/10 | 96 | 77 | 93 | 96 |
| Corcat P-18 + Dequest 2060 | 10/10 | 100 | 87 | 91 | 100 |
| Corcat P-18 + Dequest 2060 + $MoO_4$ | 10/10/20 | 100 | 96 | 88 | 100 |

*with 100 mg/L $HCO_3^-$ alkalinity added to the makeup water
+deposit weight was higher than for control

What we claim is:

1. A method for controlling silica/silicate deposition including calcium and magnesium silicates in an aqueous system having a pH of less than about 9 comprising adding to said system an effective amount of a composition comprising: (a) a water soluble polyethylene imine having a molecular weight of less than about 20,000; (b) diethylene triamine penta(methylene phosphonic acid); and (c) a molybdate ion source; wherein the weight ratio of (a):(b), on an active basis, ranges from about 4:1 to about 1:4 and wherein the weight ratio of (a):(c), on an active basis, ranges from about 4:1 to about 1:4.

2. The method of claim 1, wherein said polymer is added at a dosage of from about 0.1 to about 200 ppm.

* * * * *